H. W. REYNOLDS.
EGG LIFTER.
APPLICATION FILED FEB. 18, 1915.
1,228,821.
Patented June 5, 1917.
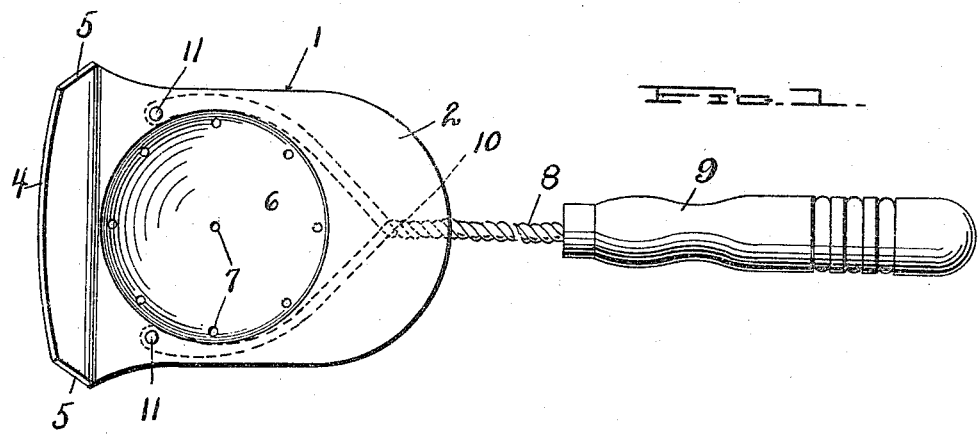
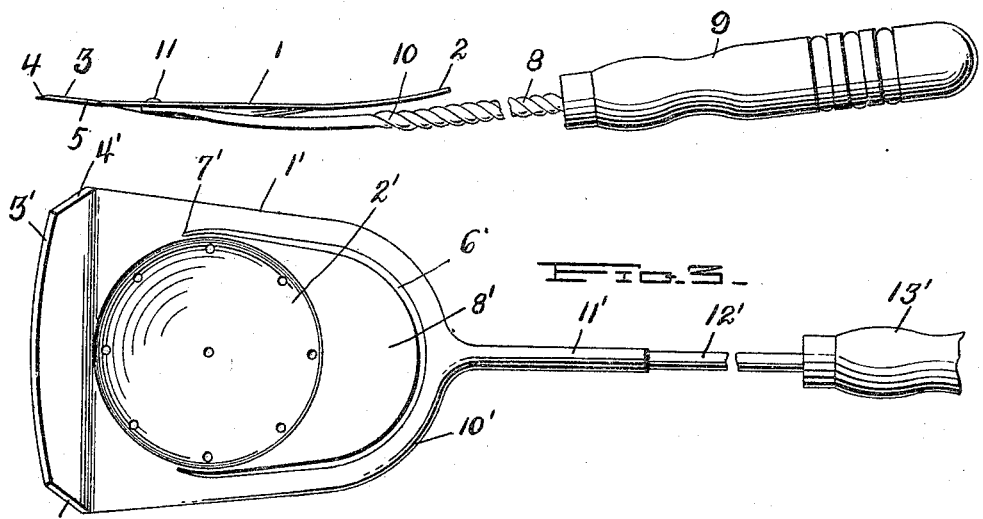
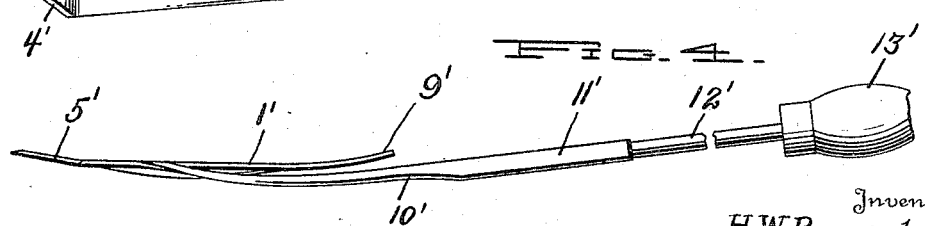
Witnesses
Arthur K. Moore
Inventor
H. W. Reynolds
By
Attorneys

UNITED STATES PATENT OFFICE.

HOWARD W. REYNOLDS, OF CHICAGO, ILLINOIS.

EGG-LIFTER.

1,228,821. Specification of Letters Patent. Patented June 5, 1917.

Application filed February 18, 1915. Serial No. 9,128.

*To all whom it may concern:*

Be it known that I, HOWARD W. REYNOLDS, a citizen of the United States, residing at Chicago, in the county of Cook, State of Illinois, have invented certain new and useful Improvements in Egg-Lifters; and I do hereby declare the following to be a full, clear, and exact description of the invention, such as will enable others skilled in the art to which it appertains to make and use the same.

This invention relates to an egg lifter.

An object of the invention resides in the provision of a device by means of which fried or poached eggs may be turned.

A further object of the invention resides in so constructing the device that the possibility of the egg accidentally sliding therefrom will be obviated.

A further object of the invention resides in so constructing the device that the possibility of the same becoming broken as it is inserted beneath the egg by pressure applied to the handle will be practically obviated.

With these and other objects in view, such as will appear as the description progresses, my invention comprises the combination and arrangement of parts as set forth in and falling within the scope of the appended claims.

Referring to the drawing:

Figure 1 is a plan view of a device constructed in accordance with my invention.

Fig. 2 is a side elevation thereof.

Fig. 3 is a plan view of a modification of my invention.

Fig. 4 is a side elevation thereof.

Referring to the drawing wherein like parts are indicated by like characters throughout the several views:—

Referring to the embodiment of my invention shown in Figs. 1 and 2 I have provided a blade 1 which is curved slightly upwardly at its rear end, as shown at 2 in Fig. 2 of the drawing, and upwardly at its front end as shown at 3 in the drawings. This front end is provided with a beveled arcuate edge 4 to facilitate the insertion of the blade between the egg and the pan. At each end of the arcuate portion 4 is formed a flat cutting edge 5 by means of which eggs which have run together in the pan may be separated.

Formed substantially centrally of this blade 1 is a concave receptacle 6 having a plurality of holes 7 therein. This receptacle 6 is depressed below the plane of the body of the blade.

A wire handle 8 is provided having a gripping portion 9 on the outer end thereof and being formed of two wires twisted together. These wires are separated, as at 10, and one passes to one side to the concave receptacle and the other to the other side beneath the blade 1. The ends of these wires are secured, as at 11, to the under side of the body of the blade adjacent the front edge thereof, the ends of the wire being in spaced relation.

The securing of the handle at points separated from each other and adjacent the forward edge of the blade is particularly advantageous inasmuch as it practically prevents the breaking of the handle from the blade, a difficulty which is usually encountered when the handle is secured to the rear of the blade. This is due to the fact that the points 11, where the force is applied to the blade, are adjacent the forward edge 4 or the fulcrum point of the lever formed.

By providing the blade 1 with a concave receptacle 6 the eggs or in fact any material which is lifted on the blade will be prevented from sliding therefrom inasmuch as a portion will sink into the receptacle and be held therein. When poached eggs are lifted the water will drain through the holes 7 and the egg will be located in the receptacle 6.

Now in the embodiment of my invention shown in Figs. 3 and 4 I have provided a blade 1' which has a concave receptacle 2' depressed below the plane of the body portion. This blade has also a curved beveled front edge 3' and straight cutting edges 4' similar to the edges 4 and 5, respectively, of the embodiment shown in Figs. 1 and 2. The forward end of this blade is raised, as indicated at 5' in Fig. 4 of the drawing, to facilitate the insertion of the blade between the egg and the pan. Instead of securing a handle to the blade, as I have done in the device shown in Figs. 1 and 2, I have cut away a portion of the material of the blade forming a slot 6', the said slot extending to points 7' adjacent the forward edge of the blade 1'. This slot produces a tongue 8' which is curved upwardly, as shown at 9' in Fig. 4 of the drawing. This upturned portion prevents an egg from sliding from the back of the blade. The slot 6' further produces a rolled yoke 10' integral with the blade 1' which terminates in a socket 11'. Secured in this socket is a handle 12' formed of a single piece of wire on the end of which is a grip member 13'.

From the foregoing description it will be seen that I have provided an egg lifter by means of which eggs may be lifted or turned readily. I have so constructed the device that the possibility of the eggs slipping therefrom during the raising or turning movements will be obviated. I have further constructed the device in such manner that the handle will be secured adjacent the forward edge and consequently the force applied to the handle to force the blade beneath an egg will not have any great tendency to break the handle from the blade. Moreover this arrangement is such that a certain amount of yielding is given to the blade where it supports the egg and thus shock tending to break the skin of the yolk is prevented since the egg supporting part of the blade is in a measure spring suspended.

While I have illustrated and described a particular embodiment of my invention I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. An egg lifter comprising a blade having a forward scooping edge and a handle having its forward extremity connected to the underside of the blade adjacent the front thereof and spaced from the remaining portion of the blade.

2. An egg lifter comprising a blade having a forward scooping edge and a central downwardly dished portion, and a handle having a bifurcated end connected at its extremities to the underside of the blade adjacent the front thereof and spaced from the remaining portion of the blade.

3. An egg lifter including a main member having a depressed draining portion and provided with a U-shaped slot straddling the draining portion, and having its bight to the rear of the draining portion, the portion of the member within the slot being upturned at its rear end, and a rearward extension on the portion exterior to the slot arranged to form a handle socket.

In testimony whereof, I affix my signature, in the presence of two witnesses.

HOWARD W. REYNOLDS.

Witnesses:
 WM. SHERMAN CARSON,
 EDITH C. SCOTT.

Copies of this patent may be obtained for five cents each, by addressing the "Commissioner of Patents, Washington, D. C."